US012634160B2

(12) United States Patent (10) Patent No.: US 12,634,160 B2
Raj et al. (45) **Date of Patent: *May 19, 2026**

(54) PREVENTING HIGH AVAILABILITY PAIRS OF NETWORK DEVICES FROM SENDING OUT DUPLICATE MULTICAST TRAFFIC FLOWS

(71) Applicant: HEWLETT PACKARD ENTERPRISE DEVELOPMENT LP, Spring, TX (US)

(72) Inventors: Anil Raj, Bangalore (IN); Tathagata Nandy, Bangalore (IN); Subramanian Muthukumar, Bangalore (IN); Srijith Ponnappan, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 419 days.

This patent is subject to a terminal disclaimer.

(21) Appl. No.: 18/345,382

(22) Filed: Jun. 30, 2023

(65) Prior Publication Data

US 2025/0007742 A1 Jan. 2, 2025

(51) Int. Cl.
H04L 12/18 (2006.01)
H04L 45/00 (2022.01)
(Continued)

(52) U.S. Cl.
CPC ........... H04L 12/18 (2013.01); H04L 12/185 (2013.01); H04L 45/16 (2013.01); H04L 45/34 (2013.01); H04L 45/60 (2013.01); H04L 45/74 (2013.01)

(58) Field of Classification Search
CPC ....... H04L 12/18; H04L 45/16; H04L 12/185; H04L 45/34; H04L 45/60; H04L 45/74
See application file for complete search history.

(56) References Cited

U.S. PATENT DOCUMENTS 7,289,505 B2 * 10/2007 Sanchez .............. H04L 12/2854
370/432
7,430,735 B1 * 9/2008 Balakrishnan .......... G06F 8/656
717/173
(Continued)

OTHER PUBLICATIONS

Aruba, a Hewlett Packard Enterprise company; "Technology Brief, High Availability From Campus to Data Center, Aruba Virtual Switching Extension (VSX)"; copyright 2021; 4 pp.
(Continued)

*Primary Examiner* — Brian J. Gillis
*Assistant Examiner* — Chhian (Amy) Ling
(74) *Attorney, Agent, or Firm* — Trop, Pruner & Hu, P.C.

(57) ABSTRACT

A process includes receiving, at a downstream interface of a high availability pair of network devices, a join request. The availability pair of network devices includes a first network device and a second network device. The join request represents a request by a client device to join a multicast group associated with a source address and a multicast group address. The process includes, responsive to the join request, exporting, by the first network device, first static multicast route information from a second interface of the first network device. The first static multicast route information corresponds to a routing of multicast traffic associated with the multicast group through the first network device. The process further includes, responsive to the join message, controlling, by the second network device, exporting of second static multicast route information from the second network device to prevent duplicate multicast traffic associated with the multicast group from being sent by the high availability pair. The second static multicast route information corresponds to a routing of the multicast traffic associated with the multicast group through the second network device.

19 Claims, 7 Drawing Sheets

(51) Int. Cl.
     H04L 45/16      (2022.01)
     H04L 45/60      (2022.01)
     H04L 45/74      (2022.01)

(56)           References Cited

U.S. PATENT DOCUMENTS

| | | | |
|---|---|---|---|
| 2014/0269700 A1* | 9/2014 | Venkataswami | H04L 45/54 |
| | | | 370/390 |
| 2014/0369186 A1* | 12/2014 | Ernstrom | H04L 49/55 |
| | | | 370/228 |
| 2015/0333921 A1* | 11/2015 | Kannan | H04L 45/54 |
| | | | 370/392 |
| 2022/0131786 A1* | 4/2022 | Nandy | H04L 45/64 |

OTHER PUBLICATIONS

Techhub; "RPF check mechanism"; https://techhub.hpe.com/eginfolib/networking/docs/switches/5920-5900/5200-4538_ip-multi_cg/content/491349099.htm; downloaded Jun. 28, 2023; 3 pp.
CCNP Encor 350-401 Tutorials, CCNA 200-301 Tutorials; "Understanding Protocol Independent Multicast (PIM)"; https://study.com/undestanding-protocol-independent-multicast-pim/; downloaded Jun. 28, 2023; 3 pp.
Wikipedia; "Internet Group Management Protocol"; https://en.wikipedia.org/wiki/Internet_Group_Management_Protocol; downloaded Jun. 28, 2023; 4 pp.

* cited by examiner

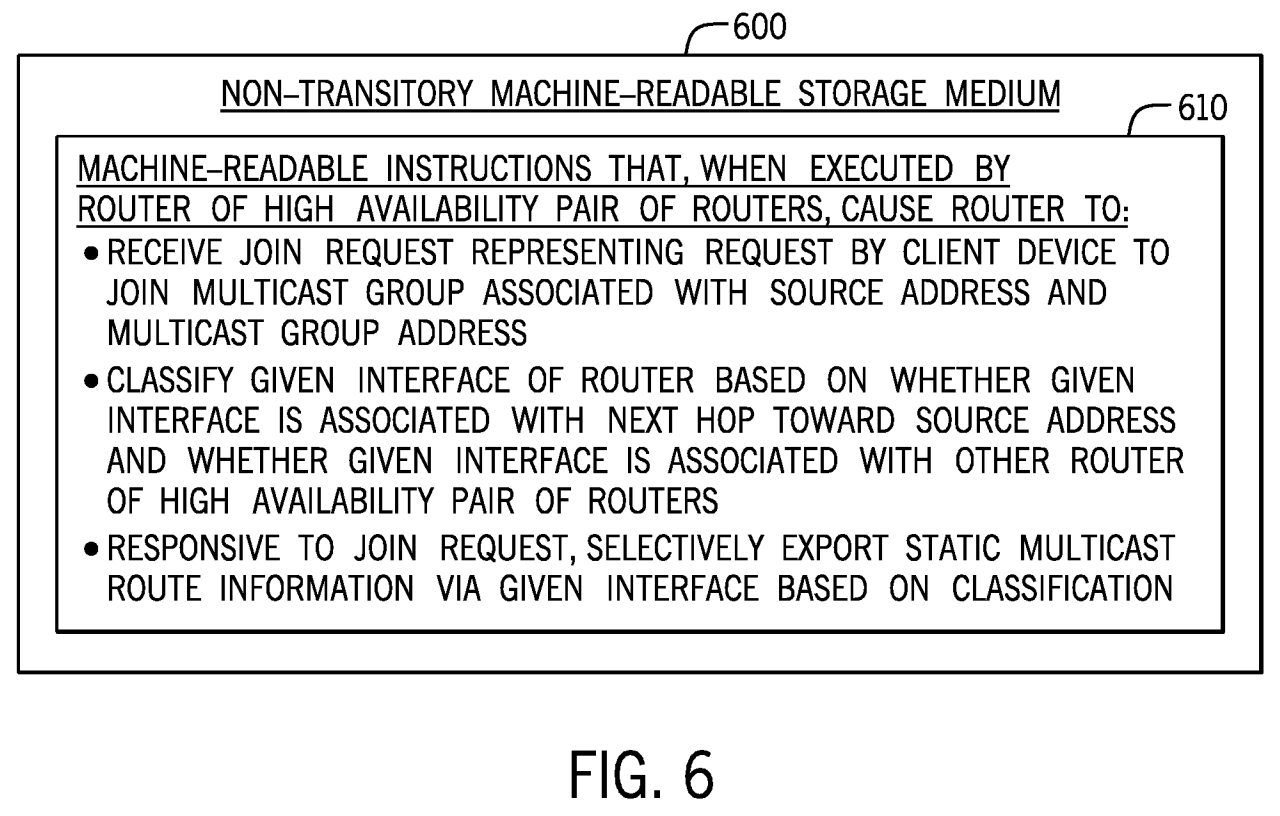

600

610

NON-TRANSITORY MACHINE-READABLE STORAGE MEDIUM

MACHINE-READABLE INSTRUCTIONS THAT, WHEN EXECUTED BY ROUTER OF HIGH AVAILABILITY PAIR OF ROUTERS, CAUSE ROUTER TO:

- RECEIVE JOIN REQUEST REPRESENTING REQUEST BY CLIENT DEVICE TO JOIN MULTICAST GROUP ASSOCIATED WITH SOURCE ADDRESS AND MULTICAST GROUP ADDRESS

- CLASSIFY GIVEN INTERFACE OF ROUTER BASED ON WHETHER GIVEN INTERFACE IS ASSOCIATED WITH NEXT HOP TOWARD SOURCE ADDRESS AND WHETHER GIVEN INTERFACE IS ASSOCIATED WITH OTHER ROUTER OF HIGH AVAILABILITY PAIR OF ROUTERS

- RESPONSIVE TO JOIN REQUEST, SELECTIVELY EXPORT STATIC MULTICAST ROUTE INFORMATION VIA GIVEN INTERFACE BASED ON CLASSIFICATION

FIG. 6

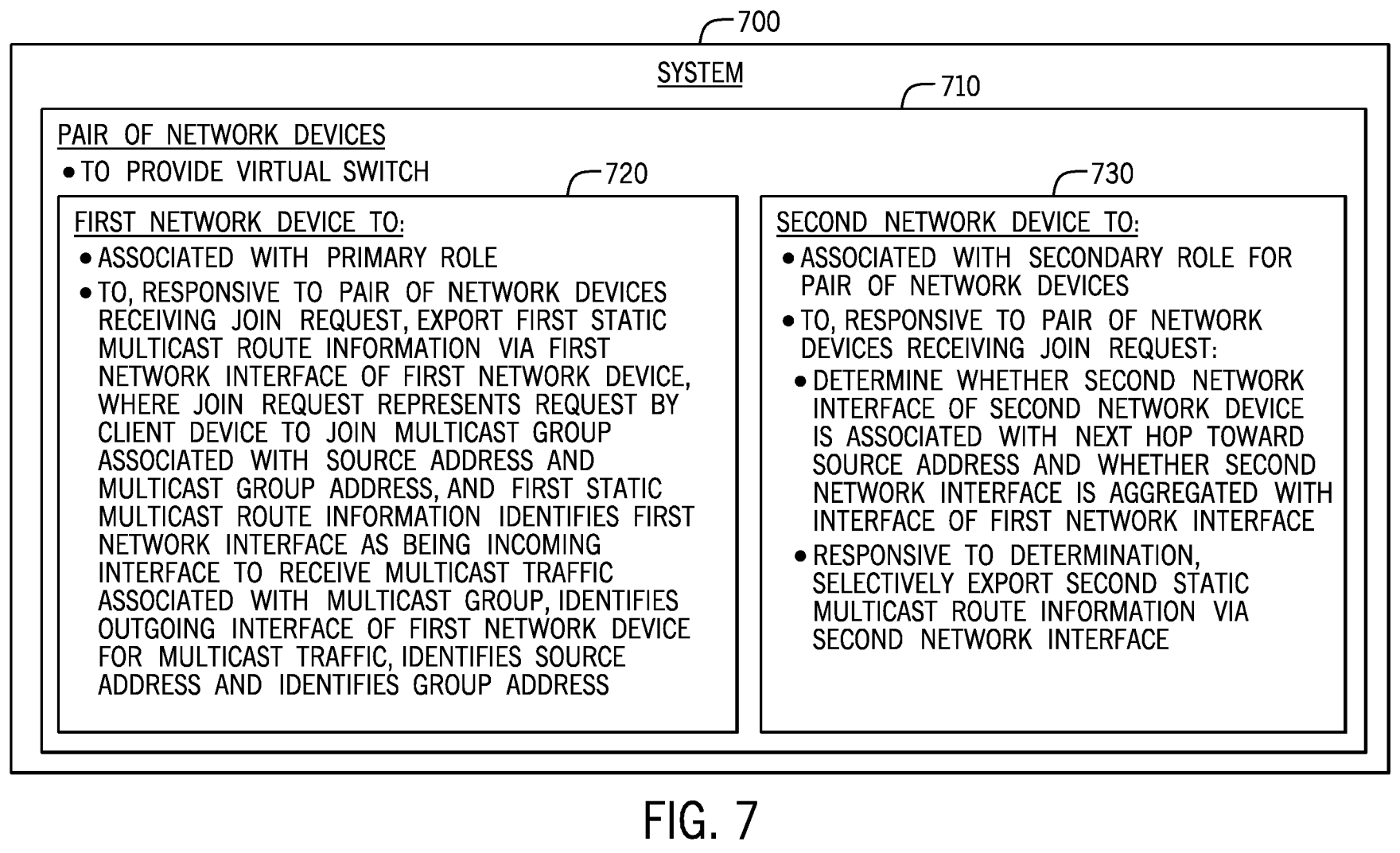

SYSTEM 700

710

PAIR OF NETWORK DEVICES
- TO PROVIDE VIRTUAL SWITCH

720

FIRST NETWORK DEVICE TO:
- ASSOCIATED WITH PRIMARY ROLE
- TO, RESPONSIVE TO PAIR OF NETWORK DEVICES RECEIVING JOIN REQUEST, EXPORT FIRST STATIC MULTICAST ROUTE INFORMATION VIA FIRST NETWORK INTERFACE OF FIRST NETWORK DEVICE, WHERE JOIN REQUEST REPRESENTS REQUEST BY CLIENT DEVICE TO JOIN MULTICAST GROUP ASSOCIATED WITH SOURCE ADDRESS AND MULTICAST GROUP ADDRESS, AND FIRST STATIC MULTICAST ROUTE INFORMATION IDENTIFIES FIRST NETWORK INTERFACE AS BEING INCOMING INTERFACE TO RECEIVE MULTICAST TRAFFIC ASSOCIATED WITH MULTICAST GROUP, IDENTIFIES OUTGOING INTERFACE OF FIRST NETWORK DEVICE FOR MULTICAST TRAFFIC, IDENTIFIES SOURCE ADDRESS AND IDENTIFIES GROUP ADDRESS

730

SECOND NETWORK DEVICE TO:
- ASSOCIATED WITH SECONDARY ROLE FOR PAIR OF NETWORK DEVICES
- TO, RESPONSIVE TO PAIR OF NETWORK DEVICES RECEIVING JOIN REQUEST:
- DETERMINE WHETHER SECOND NETWORK INTERFACE OF SECOND NETWORK DEVICE IS ASSOCIATED WITH NEXT HOP TOWARD SOURCE ADDRESS AND WHETHER SECOND NETWORK INTERFACE IS AGGREGATED WITH INTERFACE OF FIRST NETWORK INTERFACE
- RESPONSIVE TO DETERMINATION, SELECTIVELY EXPORT SECOND STATIC MULTICAST ROUTE INFORMATION VIA SECOND NETWORK INTERFACE

FIG. 7

PREVENTING HIGH AVAILABILITY PAIRS OF NETWORK DEVICES FROM SENDING OUT DUPLICATE MULTICAST TRAFFIC FLOWS

BACKGROUND

There are a number of different ways in which data may be transferred between source and recipient network devices. For example, in unicast communication, which is a one-to-one transfer, data is sent from a source network device to a specific recipient network device. As another example, in broadcast communication, which is a one-to-many transfer, data is sent from a source network device to all network devices that are located in a network or in a particular subnet. As another example, in multicast communication, which is a one-to-many transfer, data is sent from a source network device to a set of recipient network devices that belong to a particular multicast group.

BRIEF DESCRIPTION OF THE DRAWINGS

FIG. 6 is an illustration of machine-readable instructions that are stored on a machine-readable storage medium, which, when executed by a router of an HA pair of routers, cause the router to selectively export static multicast routes to prevent the HA pair from sending out duplicate multicast traffic flows according to an example implementation.

FIG. 7 is a block diagram of a system that includes a pair of network devices that provide a virtual switch that selectively exports static multicast routes to prevent the virtual switch from sending out duplicate multicast traffic flows according to an example implementation.

DETAILED DESCRIPTION

Figure 1:
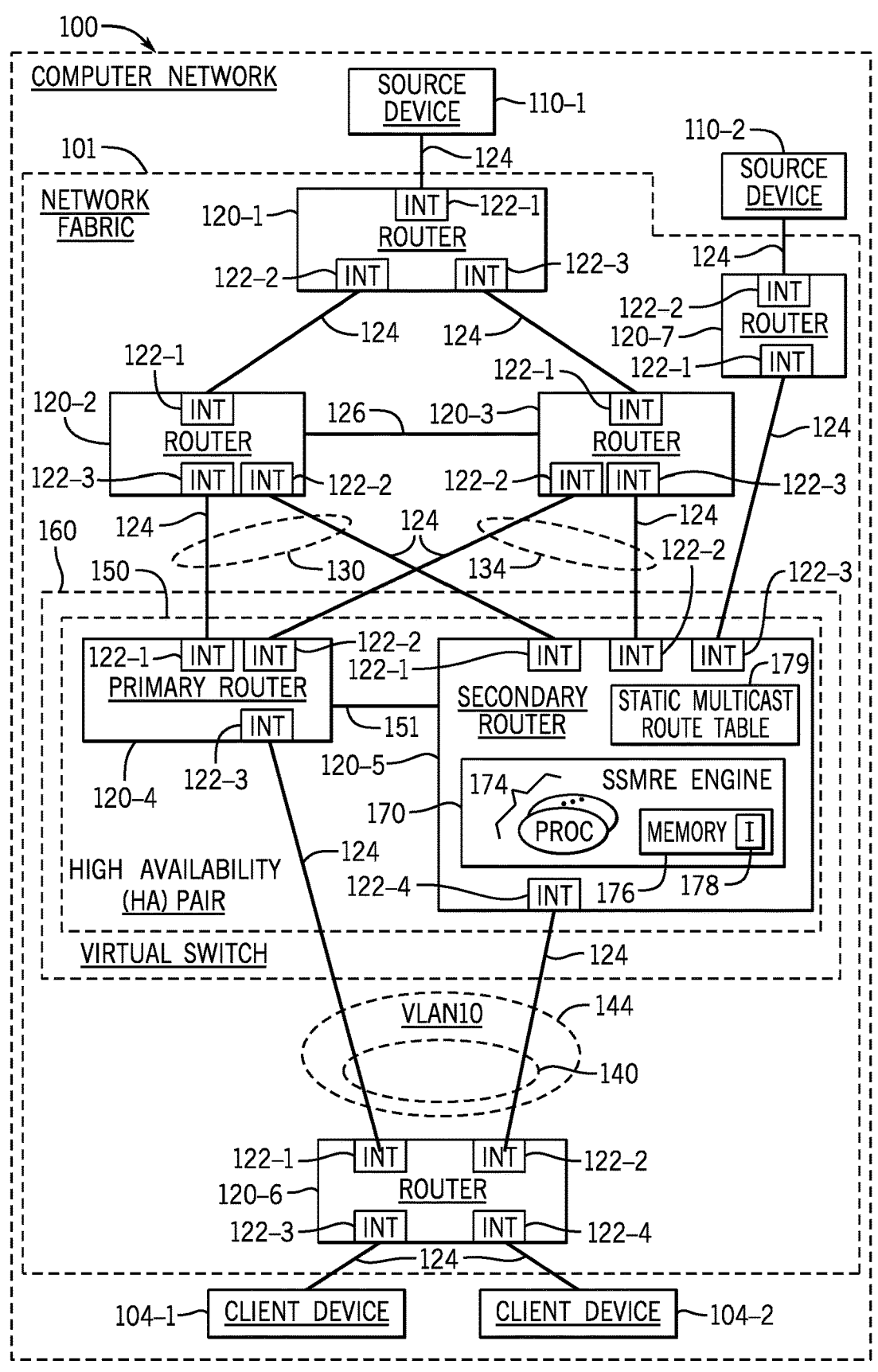
FIG. 1 is a block diagram of a network having a high availability (HA) pair of routers that selectively exports static multicast routes in a way that prevents the HA pair from sending out duplicate multicast traffic flows according to an example implementation.

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

The terminology that is used herein is for the purpose of describing particular examples only and is not intended to be limiting. As used herein, the singular forms "a," "an," and "the" are intended to include the plural forms as well, unless the context clearly indicates otherwise. The term "plurality," as used herein, is defined as two or more than two. The term "another," as used herein, is defined as at least a second or more. The term "connected," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

A network may include one or multiple routers, which may serve a number of different roles. For example, a router may be part of a network's access layer at the edge of the network for purposes of connecting network end devices (e.g., client devices and source devices) to the network. As another example, a router may be part of a network's high speed core layer. As another example, a router may be part of a distribution layer that connects the core and access layers.

A network may communicate a number of multicast traffic flows. A given multicast traffic flow may include data (e.g., a datagram or a sequence of packets) that is received by a particular multicast group of recipient network devices (herein called "client devices"). A multicast group and a corresponding multicast traffic flow may be identified by a multicast group address and a source address. The source address corresponds to a source of the multicast traffic flow. A multicast group may have an associated network structure, called a multicast distribution tree, which defines routes between the multicast source and the client devices. In an example, a multicast distribution tree may be a source tree in which the multicast source is the root of the tree. In another example, a multicast distribution tree may be a rendezvous tree in which a designated forwarding network device, or rendezvous point, is the root of the tree.

A protocol, such as the Simple Service Discovery Protocol (SSDP), may be used by providers of multicast services (e.g., printing services, streaming services or other services) to advertise the services, and the SSDP may be used by client devices to subscribe to multicast services. A client device may join a particular multicast group (and therefore, subscribe to the multicast service) by sending a join message (e.g., an Internet Group Management Protocol (IGMP) message), which indicates that the client device wants to be a member of the multicast group and receive the corresponding multicast traffic flow. An IGMP message, in general, refers to a message having a specific format (e.g., a specific format) that complies with an IGMP protocol, such as, for example, IGMPv2 defined in Request for Comment (RFC) 2236 or IGMPv3 defined in RFC 3376 and RFC 4604. A IGMP message contains a message type, such as a query, or join; and an IGMP message may further specify a group address. An IGMP message may specify a multicast source address. A router may add itself to a multicast distribution tree for a particular multicast group by sending a join message (e.g., a Protocol Independent Multicast (PIM) join message) back toward the root of the multicast distribution tree.

Due to the nature of multicast communication, a given router may receive packets corresponding to duplicate multicast traffic flows on multiple ingress interfaces of the router. In this context, an "ingress interface" refers to a port, or interface, of a router that receives a particular packet. An "egress interface" refers to a port, or interface, of the router used by the router to send a particular packet. For such purposes as reducing network congestion and preventing loopbacks, the router may perform a reverse-path forwarding (RPF) check for a received multicast packet to determine if the ingress interface on which the packet was received would be selected by the router as an egress interface to send a packet to the source of the received multicast pocket. If the router determines that the ingress interface would be selected by the router as the interface to reach the source, then the router sends out the packet, and otherwise, the router drops the packet.

The effect of a router's RPF checks is that the router has a single RPF interface for a given multicast group, and the router drops packets corresponding to the same given multicast group, which are received at other, non-RPF ingress interfaces of the router. The RPF checks prevent a router from possibly sending out duplicate multicast traffic flows. In general, challenges may arise if a client device receives duplicate multicast traffic flows, as duplicate multicast traffic flows may cause any of a number of adverse effects, such as causing the client device to malfunction or causing a denial of service.

A network may contain one or multiple pairs of high availability (HA) routers. In this context, an HA pair of network devices, such as an HA pair of routers, refers to a pair of network devices that provide a failover capability, such that if one network device of the HA pair fails, the other network device of the HA pair takes over for the failed network device without interruption. In an example, for an HA pair of routers, each router of the HA pair may independently maintain its own control plane and forward data while remaining synchronized with important routing information (e.g., media address control (MAC) addresses and address resolution protocol (ARP) addresses) that is currently being used by the other router. In this way, should a router of the HA pair fail, the other router of the HA pair has the routing information to take over for the failed router. The routers may exchange routing information by messaging each other via an inter-switch communication link that communicatively connects the routers.

A particular HA pair of routers may correspond to a distribution layer of a network, and the multicast distribution trees for a particular set of multicast groups may terminate on the HA pair of routers. Interfaces of the routers of the HA pair may be aggregated together as part of a link aggregation group to form a corresponding multicast egress interface (e.g., an interface associated with a virtual local area network (VLAN) identifier) of the HA pair, which provides the multicast traffic to one or multiple downstream client network devices. Although each router of the HA pair may use RPF checks to ensure that the router does not send out duplicate multicast traffic flows, RPF checks do not prevent the HA pair as a single entity from sending out duplicate multicast traffic flows. In this manner, both routers may receive the same multicast traffic flow on respective RPF interfaces, and each router may correspondingly send out the received multicast traffic flow via the HA pair's multicast egress interface, thereby resulting in duplicate multicast traffic flows being sent to a client device.

In accordance with example implementations that are described herein, an HA pair of routers is constructed to configure multicast distribution trees in a way that prevents the HA pair from sending out duplicate multicast traffic flows. More specifically, in accordance with some implementations, an HA pair of routers is constructed to prevent more than one RPF interface of the HA pair from being added to a particular multicast distribution tree. Due to the configuration of the multicast distribution tree in this manner, RPF checks may then be effectively used by the routers to drop duplicate packets of the same multicast flow.

In an example, as further described herein, a designated router of an HA pair of routers may be constructed to prevent any interface of the router, which may potentially be an RPF interface for a multicast traffic flow, from being part of the corresponding multicast distribution tree. In this way, due to the configuration of the multicast distribution tree and the RPF checks used by the designated router, the designated router drops all multicast packets for the multicast group. The other non-designated router of the HA pair of routers drops all packets for the multicast group, except for the multicast packets that are received on the non-designated router's RPF interface for the multicast group. Therefore, the HA pair of routers does not send out duplicate multicast traffic flows.

A given router may be part of one or multiple multicast distribution trees. In one approach, a router learns the source addresses, group addresses and upstream interfaces for different multicast distribution trees from the data traffic. Moreover, with this approach, the router derives the corresponding downstream interfaces using a dynamic protocol, such as a PIM-Sparse Mode (SM) or a PIM-Dense Mode (DM) protocol. Constructing a multicast distribution tree in this manner may, however, place a significant burden on the routers, and this burden may increase with the number of client devices and increase with the number of routers.

In another approach, a router may be configured with a static multicast table, which may define static routes through the router for different corresponding multicast groups. In an example, the static multicast table may have records, or entries, which correspond to respective multicast groups. In this manner, each entry may contain a 2-tuple of a multicast source address and a multicast group address for purposes of identifying a particular multicast group. In an example, an entry of a static multicast table may associate a corresponding multicast group with an ingress interface of the router and an egress interface of the router. A static multicast table may have multiple entries that correspond to the same multicast group but are associated with different ingress interface(s) and/or egress interface(s). Moreover, the entries of a static multicast table may be compressed, in that by the use of a wildcard symbol (e.g., a wildcard symbol for the source address), a single entry of the static multicast table may be associated with multiple multicast groups (e.g., groups that share the same group address) that share the same ingress interface and egress interface.

With the static multicast route approach, a router may, through a redistribution operation, export the router's static multicast routes for a given multicast group to other routers. The exported static multicast routes allows the other routers to construct or update their corresponding static multicast tables. A router may export the router's static multicast routes for a given multicast group in response to an ingress interface of the router receiving a PIM join/IGMP join associated with the given multicast group. In one approach, a router may, in response to receiving a PIM/IGMP join at a particular ingress interface, export a set of static multicast routes by embedding information describing the static multicast routes in a set of PIM joins that the router sends out to other routers.

One router of an HA pair may be designated as serving a "primary role" (or being the "primary router") and the other router of the HA pair may be designated as serving a "secondary role" (or being the "secondary router"). In an example, the primary and secondary roles may be used to designate the specific router (e.g., the primary router) of the HA pair that takes over in the event that the inter-switch link between the routers of the HA pair fails. The primary and secondary designations may be based on other criteria, in accordance with further implementations.

In accordance with example implementations that are described herein, an HA pair of routers are constructed to selectively export static multicast routes for a particular multicast group in a way that ensures that no more than a single RPF interface of the HA pair is added to the corresponding multicast distribution tree. For this purpose, in accordance with some implementations, a designated router of an HA pair, such as a secondary router of the HA pair, includes a selective static multicast route export (SSMRE) engine. The SSMRE engine exports the secondary router's static multicast routes in a way that excludes from the exporting any of the secondary router's interfaces that could potentially be an RPF interface for a particular multicast group.

In an example, in accordance with some implementations, in response to the secondary router receiving an IGMP/PIM join that is associated with a particular multicast group, the SSMRE engine exports the secondary router's static multicast routes for the multicast route in a way that bypasses, or omits, exporting a static multicast route on any interface of the secondary router, which could potentially be an RPF interface for the multicast group.

In accordance with example implementations, for a particular multicast group, the SSMRE engine relies on a grouping, or a classification, of the interfaces of the secondary router for purposes of determining which interface(s) should be used to export static multicast route information and which interface(s) should be excluded from exporting static multicast route information. Depending on the particular implementation, the SSMRE engine may perform the classification directly from configuration information that designates the classifications of the egress interfaces for different multicast groups, or the SSMRE engine may indirectly determine the classifications from other information. Regardless of the particular entity that performs the classification, the classification identifies potential RPF interface of the secondary router for a particular multicast group, and accordingly, the SSMRE engine excludes this interface from exporting static multicast routes for the particular multicast group. In accordance with some implementations, the classification may exclude an interface from exporting static multicast route information if the interface meets the following criteria: 1. the interface is specific to the secondary router (i.e., the interface is not shared with the primary router); and 2. the interface corresponds to the next hop toward the multicast source. In accordance with example implementations, interfaces not meeting both criteria would not be RPF interfaces. In an example, an interface that does not meet the criteria includes an orphan interface, which cannot be used to reach the multicast source. In another example, an interface that does not meet the criteria is an interface that is aggregated with an interface of the primary router. In accordance with further implementations, one or multiple other criteria may define interfaces that may potentially be RFP interfaces and interfaces that will not be RFP interfaces, and the SSMRE engine may export its static multicast routers based on these criteria.

Referring to FIG. 1, in accordance with example implementations, a computer network 100 may include one or multiple multicast source devices 110 (called "source devices 110" herein) that are coupled to one or multiple multicast recipient client devices 104 (called "client devices 104" herein) through network fabric 101. For the specific implementation that is depicted in FIG. 1, the network fabric 101 includes two source devices 110-1 and 110-2 and two client devices 104-1 and 104-2, although the network fabric may, in accordance with further implementations, have more or less than two source devices 110 and/or more or less that two client devices 104. Also, for the specific implementation that is depicted in FIG. 1, the network fabric 101 includes routers 120 that are coupled together via links 124 (e.g., network cable-based links and backplane-based links). Although FIG. 1 depicts seven example routers 120-1, 120-2, 120-3, 120-4, 120-5, 120-6 and 120-7, the network fabric 101 may contain fewer or more than seven routers 120, in accordance with further implementations. Moreover, the routers 120 may be connected in a different arrangement other than the exemplary network architecture depicted in FIG. 1, in accordance with further implementations.

In an example, a source device 110 may be a computer platform. A "computer platform," as used herein, refers to an electronic device that has a processing resource, which is capable of executing machine-readable instructions (e.g., "software"). In an example, a source device 110 may be a server, such as a blade server, a rack server or a standalone server. In another example, a source device may be an administrative or management node of a cluster (e.g., a high performance computing (HPC) cluster). In another example, a source device may be an Internet of Things (IoT) device. A source device 110 may take on numerous other forms, in accordance with further implementations, such as a portable computer, a desktop computer, a tablet computer, a sensor, a camera, or other electronic device that has a processing resource.

Regardless of its particular form or architecture, a source device 110 may provide one or multiple multicast traffic flows. In this context, a "multicast traffic flow" refers to a communication of data (e.g., packets or datagrams), which is associated with a source address of the source device 110 and a multicast group address. In an example, the source address may be an IP address, and the group address may be an IP address.

In an example, a source device 110 may be a content delivery server that provides a multicast traffic flow for purposes of providing a stream of audio content, visual content or audiovisual content. In an example, a multicast traffic flow may be a stream of data that represents voice-over-IP (VOIP) content. In another example, a multicast traffic flow may contain data that represents content for a television channel. In another example, a multicast traffic flow may contain data that represents video on demand (VOD) content. In another example, a multicast traffic flow may contain data that represents video conferencing content. In another example, a multicast traffic flow may contain data that represents streaming audio content. In another example, a multicast traffic flow may contain data that represents image content captured by one or multiple sensors (e.g., cameras).

In another example, a source device 110 may be an administrative node of a cluster, and the administrative node may provide a multicast traffic flow for purposes of communicating data to a selected group of compute nodes of the cluster. In an example, the multicast traffic flow may contain data that represents an installation image (e.g., an image containing a root file system). In another example, the multicast traffic flow may contain data that represents a patch image.

The multicast traffic flow may relate to any of a number of different services (e.g., financial services, file sharing services, print services, learning services, data warehouse services, or other services) in accordance with further implementations.

In an example, a client device 104 may be a computer platform. As specific examples, a client device 104 may be a desktop computer, a notebook computer, a tablet computer, a smartphone, a storage array, a network switch, a gateway device, a router, an IoT device, a television, a wearable computer, or another electronic device that has a processing resource.

Regardless of its particular form or architecture, a client device 104, such as client device 104-1, may be part of a multicast group, such as a particular multicast group that corresponds to a particular address (called a "source address" herein) of the source device 110-1 and a multicast group address. In an example, the source device 110-1 may advertise a service using SSDP, and the client device 104-1 may subscribe, or join, a multicast group associated with the service using IGMP messaging. In an example, an IGMP querier (e.g., the router 120-6 or another router) may send IGMP query messages to the client devices 104-1 and 104-2, which identify a particular multicast group and serves as inquiries regarding whether the client devices 104-1 and 104-2 want to be or are members of the multicast group. Continuing the example, the client device 104-1 may respond to the query message by sending an IGMP join message that indicates that the client device 104-1 wants to be or is a member of the multicast group.

The sending of an IGMP join message by a client device 104, in accordance with example implementations, initiates a series of IGMP/PIM joins being sent upstream toward the source device 110. For example, in response to receiving an IGMP join message from a client device 104, the router 120-6 may send out a join message (e.g., an IGMP join message) toward the source device 110 for purposes of indicating that the router 120-6 is to be part of the multicast distribution tree for the multicast group. In an example, the router 120-4 may, in response to an IGMP join message from the router 120-6, send out PIM join messages upstream toward the source device 110-1 for purposes of adding static multicast routes of the router 120-4 to the multicast distribution tree. Other routers 120 may, in response to receiving PIM join messages, export their static multicast routes upstream toward the source device 110-1 using corresponding PIM joins. The exporting of the static multicast routes upstream toward the source device 110-1 builds the multicast distribution tree for the multicast group.

In accordance with some implementations, the computer network 100 may use a PIM-SM routing protocol that assumes that the recipient client devices for the multicast group are sparsely distributed throughout the computer network 100. Stated differently, the PIM-SM routing protocol assumes that a given client device does not want to be a member of a given multicast group and relies on client devices requesting to join the multicast group so that the corresponding part of the network may be added to the multicast distribution tree for the multicast group. In another example, the computer network 100 may employ a PIM-DM routing protocol that initially assumes, for a given multicast group, that all client devices are part of the multicast group. Pursuant to the PIM-DM protocol, the computer network 100 prunes, or removes, paths of the computer network 100 from the multicast distribution tree, which do not contain client devices that have subscribed to the multicast group.

In the context that is used herein, a "router" generally refers to a network device that connects multiple networks together and is constructed to recognize and respond to a multicast communication protocol (e.g., the PIM-SM protocol or the PIM-DM protocol). In an example, a router may operate at level three (L3) of the Open Systems Interconnection (OSI) model. In examples, the router may be an L3 switch, a gateway, a multicast router, a bridge, a gateway, a component of a Gen-Z or a Compute Express Link (CXL) network, a processor device, or a fabric switch that includes one or multiple of the foregoing devices.

A router 120, in accordance with example implementations, includes multiple ports, or interfaces 122, for purposes of connecting the router 120 to different networks. For the example implementation depicted in FIG. 1, the router 120-4 has three interfaces 122-1, 122-2 and 122-3 that are connected by corresponding links 124 to an interface 122-3 of a router 120-2, an interface 122-2 of a router 120-3 and an interface 122-1 of a router 120-6, respectively. As also depicted in the example implementation of FIG. 1, the router 120-5 has four interfaces 122-1, 122-2, 122-3 and 122-4, which are connected by corresponding links to an interface 122-2 of the router 120-2, an interface 122-3 of the router 120-3, an interface 122-1 of the router 120-7 and an interface 122-2 of the router 120-6, respectively.

In accordance with example implementations, when a given router 120 receives a multicast packet on an ingress interface 122, the router 120 determines whether the ingress interface 122 is the RPF interface for the multicast packet. In general, an "RPF interface" refers to the interface 122 of the router 120, which corresponds to the optimal unicast route (as determined by the router 120) to reach the source (e.g., a rendezvous point (RP) device or a source device 110) of the packet. A router 120 may use any of a number of different techniques to determine the optimal unicast route.

If a router 120 determines that an ingress interface 122 that receives a multicast packet is not the RPF interface for the multicast packet, then the router 120 drops the multicast packet. If the router 120 determines that the ingress interface that receives the multicast packet is the RPF interface for the multicast packet, then, in accordance with example implementations, the router 120 sends the packet out on its egress interfaces 122. In this way, although the router 120 may receive the same multicast packet on multiple ingress interfaces, the router 120, due to the RPF check, drops all of the received multicast packet(s), except for the multicast packet that is received on the RPF interface 122.

In an example, a router 120 may, as part of an RPF check, first check a multicast forwarding table for purposes of determining whether an entry of the multicast forwarding table corresponds to the received multicast packet. The entries of the multicast forwarding table may be associated with different (S,G) tuples, where the "S" represents the source address of a particular multicast group and the "G" represents the group address of the particular multicast group. The entry identifies an interface 122 of the router 120 that is associated with the (S,G) tuple. If the router 120 determines that an entry of the multicast forwarding table corresponds to the received multicast packet, then the entry identifies the RPF interface.

If the multicast forwarding table does not contain an entry that corresponds to the multicast packet, then the router 120 may, in accordance with example implementations, determine the RPF route (e.g., the optimal unicast route) back to the source for the multicast packet and correspondingly, identify the RPF interface for the multicast packet. The router 120 may then create an entry in the multicast forwarding table for the multicast group and the corresponding identified RPF interface.

The router 120 determines, based on either the RPF interface identified through the multicast routing table or the RPF interface identified via the router 120 determining the RPF route, whether the interface 122 that received the multicast packet is the RPF interface. Based on this determination, the router 120 either drops the multicast packet (if the interface 122 is not the RPF interface) or sends out the multicast packet on all outgoing interfaces 122 (if the interface 122 is the RPF interface).

For the example implementation that is depicted in FIG. 1, the routers 120-4 and 120-5 collectively form a virtual switch 160. In accordance with example implementations, the virtual switch 160 corresponds to a high availability (HA) pair 150 of routers that (assuming neither router 120-4 or 120-5 have failed) are both active and maintain their respective control planes independently from each other. Using an inter-switch communication link 151, the routers 120-4 and 120-5, in accordance with example implementations, share information (e.g., MAC addresses and ARP addresses) so that should one of the routers 120-4 and 120-5 fail, the surviving router 120 may take over the control plane of the failed router 120. As further depicted in FIG. 1, in accordance with example implementations, the router 120-4 has a primary role and as such, is designated as a "primary router." Moreover, as also depicted in FIG. 1, the router 120-1 has a secondary role and as such, is designated as being a "secondary router." In accordance with some implementations, the designation of the primary and secondary roles refers to which router 120-4 or 120-5 takes over as the sole router for the HA pair 150 if the inter-switch communication link 151 fails. The designation of the primary and secondary roles may depend on other criteria, in accordance with further implementations.

Interfaces of the primary router 120-4 and the secondary router 120-5 may be grouped, or aggregated, together. For example, in accordance with some implementations, an interface 122-3 of the primary router 120-4 may be aggregated with an interface 122-4 of the secondary router 120-5 to form a corresponding link aggregated group (LAG) 140. Moreover, as depicted at 144, the LAG 140 may be associated with a particular VLAN identifier, such as "VLAN10" as depicted in FIG. 1. Due to this association, the LAG 140 is referred to herein as the "VLAN10 interface 144." Moreover, as further depicted in FIG. 1, in accordance with some implementations, the interface 122-1 of the primary router 120-4 may be aggregated with the interface 122-1 of the secondary router 120-5 to form a corresponding LAG 130. Additionally, as further depicted in FIG. 1, the interface 122-2 of the primary router 120-4 may be aggregated with the interface 122-2 of the secondary router 120-5 to form a corresponding LAG 134.

Even with the primary router 120-4 and the secondary router 120-5 both performing RPF checks, the HA pair 150 may still potentially send out duplicate multicast traffic flows. For example, without the measures that are described herein for purposes of preventing HA pair 150 from sending out duplicate multicast traffic flows, the primary router 120-4 may, for example, receive a multicast traffic flow on a particular ingress interface 122, determine that the ingress interface 122 is an RPF interface for the corresponding multicast group, and send out the multicast packet via the VLAN10 interface 144. Continuing the example, the secondary router 120-5 may receive a duplicate of the same multicast packet on one of its ingress interfaces 122, determine that the ingress interface 122 is an RPF interface for the multicast group, and send out the multicast packet via the VLAN10 interface 144. Consequently, although both the primary router 120-4 and the secondary router 120-5 of the HA pair 150 apply RPF checks, the HA pair 150 sends out duplicate multicast packets.

For purposes of preventing the HA pair 150 from sending out duplicate multicast traffic flows, in accordance with example implementations, one of the routers 120-4 and 120-5 includes a selective static multicast route exchange (SSMRE) engine 170. For the specific implementation that is depicted in FIG. 1 and described herein, the secondary router 120-5 includes the SSMRE engine 170. In accordance with further implementations, the primary router 120-4 may include the SSMRE engine 170 (instead of the secondary router 120-5).

In general, the SSMRE engine 170 selectively exports static multicast route information in a way that excludes the secondary router 120-5 from receiving multicast traffic flows, which would not be dropped by the secondary router 120-5 using RPF checks. Stated differently, the SSMRE engine undertakes measures to exclude the secondary router 120-5 from the corresponding multicast distribution tree. Accordingly, in accordance with example implementations, due to the exclusion by the SSMRE engine 170 of the secondary router 120-5 from the multicast distribution tree, the secondary router 120-5 does not send out duplicate multicast traffic.

More specifically, in accordance with example implementations, the SSMRE engine 170 is constructed to not export static multicast routes of the secondary router 120-5 through its interface(s) 122 that may potentially be RPF interfaces for the corresponding multicast group. Consequently, the secondary router 120-5, due to this exclusion, does not receive any multicast packets at corresponding RPF interfaces 122 of the secondary router 120-5. Therefore, due to the RPF checks by the secondary router 120-5, all of the multicast packets that are received by the secondary router 120-5 are dropped.

In accordance with some implementations, the primary router 120-4 and the secondary router 120-5 may export a particular static multicast route by sending out a PIM join that contains data representing the static multicast route. In an example, a particular multicast group may have a source address of "10.1.1.1" and a multicast group address of "231.1.1.1." A static multicast route for this multicast group may be defined by the source address (here, "10.1.1.1"), a multicast group address (here, "231.1.1.1"), an ingress interface and an egress interface. In an example, a particular static multicast route for the primary router 120-4 for this example multicast group may include the interface 122-1 as the ingress interface and the VLAN10 interface 144 as the egress interface. By exporting this static route from its interface 122-1 via a PIM join, the primary router 120-4 may add the static multicast route to the corresponding multicast distribution tree. In accordance with example implementations, the primary router 120-4 may be configured with this particular multicast static route using the following command:

IP MULTICAST-STATIC-ROUTE R4_IF01 10.1.1.1 231.1.1.1 VLAN10, where "R4_IF01" is the name of the ingress interface 122-1; "10.1.1.1" represents the source address; "231.1.1.1" represents the multicast group address; and "VLAN10" represents the VLAN10 interface 144.

A router 120, such as the primary router 120-4, may be programmed, or configured, with a particular static multicast route in any of a number of different ways. In an example, one or multiple static multicast routes of a router 120 may be programmed via an executing application. As another example, a human administrator may program a router 120 with one or multiple static multicast routes.

As another example, the primary router 120-4 may have another static multicast route for the (10.1.1.1, 231.1.1.1) multicast group, which designates the interface 122-2 as the ingress interface and designates the VLAN10 interface 144 as the egress interface. More specifically, the primary router 120-4 may be configured for this particular static multicast route using the following command:

IP MULTICAST-STATIC-ROUTE R4_IF02 10.1.1.1 231.1.1.1 VLAN10, where "R4_IF02" represents the identifier for the interface 122-2.

The secondary router 120-5 may have static multicast routes configured as follows:

IP MULTICAST-STATIC-ROUTE R5_IF01 10.1.1.1 231.1.1.1 VLAN10,

IP MULTICAST-STATIC-ROUTE R5_IF02 10.1.1.1 231.1.1.1 VLAN10, and

IP MULTICAST-STATIC-ROUTE R5_IF05 10.1.1.1 231.1.1.1 VLAN10, where "R5_IF01," "R5_IF02," and "R5_IF05" are identifiers for the egress interfaces 122-1, 122-2 and 122-5, respectively, of the secondary router 120-5.

Although the secondary router 120-5 may be configured with static multicast routes, such as those set forth above, in accordance with example implementations, the SSMRE engine 170 selectively exports these static routes for purpose of preventing a multicast packet from being received on an interface 122 of the secondary router 120-5, which is the RPF interface for the corresponding multicast group. More specifically, in accordance with some implementations, the SSMRE engine 170 relies on a classification of the interfaces 122, which excludes potential RPF interfaces from the set of interfaces 122 from which static multicast routes are exported by the secondary router 120-5. The classification may be performed by the SSMRE engine 170, another component of the secondary router 120-4 or another component of the computer network, depending on the particular implementations.

Regardless of the particular entity that performs the classification, in accordance with some implementations, the classification may include three groups: Group 1, Group 2 and Group 3. The Group 1 interfaces include any interface 122 of the secondary router 120-5, which is aggregated with an interface 122 of the primary router 120-4. The Group 2 interfaces include any interface 122 that is specific to the secondary router 120-5 (and therefore, is not shared with an interface 122 of the primary router 120-4) and is associated with the next hop toward the multicast source. The Group 3 interfaces, include any interface 122 that corresponds to an orphan port that is specific to the secondary router 120-5. In this context, an "orphan" port or interface refers to an interface that cannot be used to reach the multicast source. In accordance with example implementations, the SSMRE engine 170 exports a static multicast route via a given interface 122 if the SSMRE engine 170 determines that the interface 122 belongs to either Group 1 or Group 3. Moreover, the SSMRE engine 170, in accordance with example implementations, bypasses exporting a static multicast route through any interface 122 that belongs to Group 2.

As examples, the specific example interfaces 122 of the secondary router 120-5, as depicted in FIG. 1, may be classified as follows. The interface 122 of the secondary router 120-5 is part of the LAG 130 shared with the primary router 120-4, and as such, the interface 122-1 belongs to Group 1. As such, the SSMRE engine 170 exports static multicast route information via the interface 122-1 of the secondary router 120-5. As another example, the interface 122-2 of the secondary router 120-5 is specific to the secondary router 120-5 and corresponds to the next hop toward the multicast source. Accordingly, in accordance with example implementations, the SSMRE engine 170 configures the secondary router 120-5 to bypass, or prevent, exporting of a static multicast route through the interface 122-2. As another example, the interface 122-3 of the secondary router 120-5, is an orphan and correspondingly, is classified as belonging to Group 3. Consequently, the SSMRE engine 170 allows the secondary router 120-5 to export static multicast route information via the interface 122-3.

As used here, an "engine" can refer to one or more circuits. For example, the circuits may be hardware processing circuits, which can include any or some combination of a microprocessor, a core of a multi-core microprocessor, a microcontroller, a programmable integrated circuit (e.g., a programmable logic device (PLD), such as a complex PLD (CPLD)), a programmable gate array (e.g., field programmable gate array (FPGA)), an application specific integrated circuit (ASIC), or another hardware processing circuit. An "engine" can refer to a combination of one or more hardware processing circuits and machine-readable instructions (software and/or firmware) executable on the one or more hardware processing circuits. Depending on the particular implementation, an engine may be formed solely from a hardware processing circuit that executes machine-executable instructions; formed from a combination of a hardware processing circuit that executes machine-executable instructions and other hardware circuitry that does not execute machine-readable instructions; or formed solely from a hardware circuit that does not execute machine-executable instructions. As depicted in FIG. 1, in accordance with some implementations, the SSMRE engine 170 may include one or multiple processors 174 (e.g., one or multiple central processing unit (CPU) cores or other processing circuits), which execute machine-readable instructions 178 that are stored in memory 176. As an example, as depicted in FIG. 1, the processor(s) 174 and the memory 176 may be, in accordance with some implementations, components of the secondary router 120-5.

In accordance with example implementations, the memory 176 may be implemented using a collection of physical memory devices. In general, the memory devices that form the memory 176, as well as other memories and storage media that are described herein, are examples of non-transitory machine-readable storage media. In accordance with example implementations, the machine-readable storage media may be used for a variety of storage-related and computing-related functions. As examples, the memory devices may include semiconductor storage devices, flash memory devices, memristors, phase change memory devices, magnetic storage devices, a combination of one or more of the foregoing storage technologies, as well as memory devices based on other technologies. Moreover, the memory devices may be volatile memory devices (e.g., dynamic random access memory (DRAM) devices, static random access (SRAM) devices, and so forth) or non-volatile memory devices (e.g., flash memory devices, read only memory (ROM) devices and so forth), unless otherwise stated herein.

Figure 2:
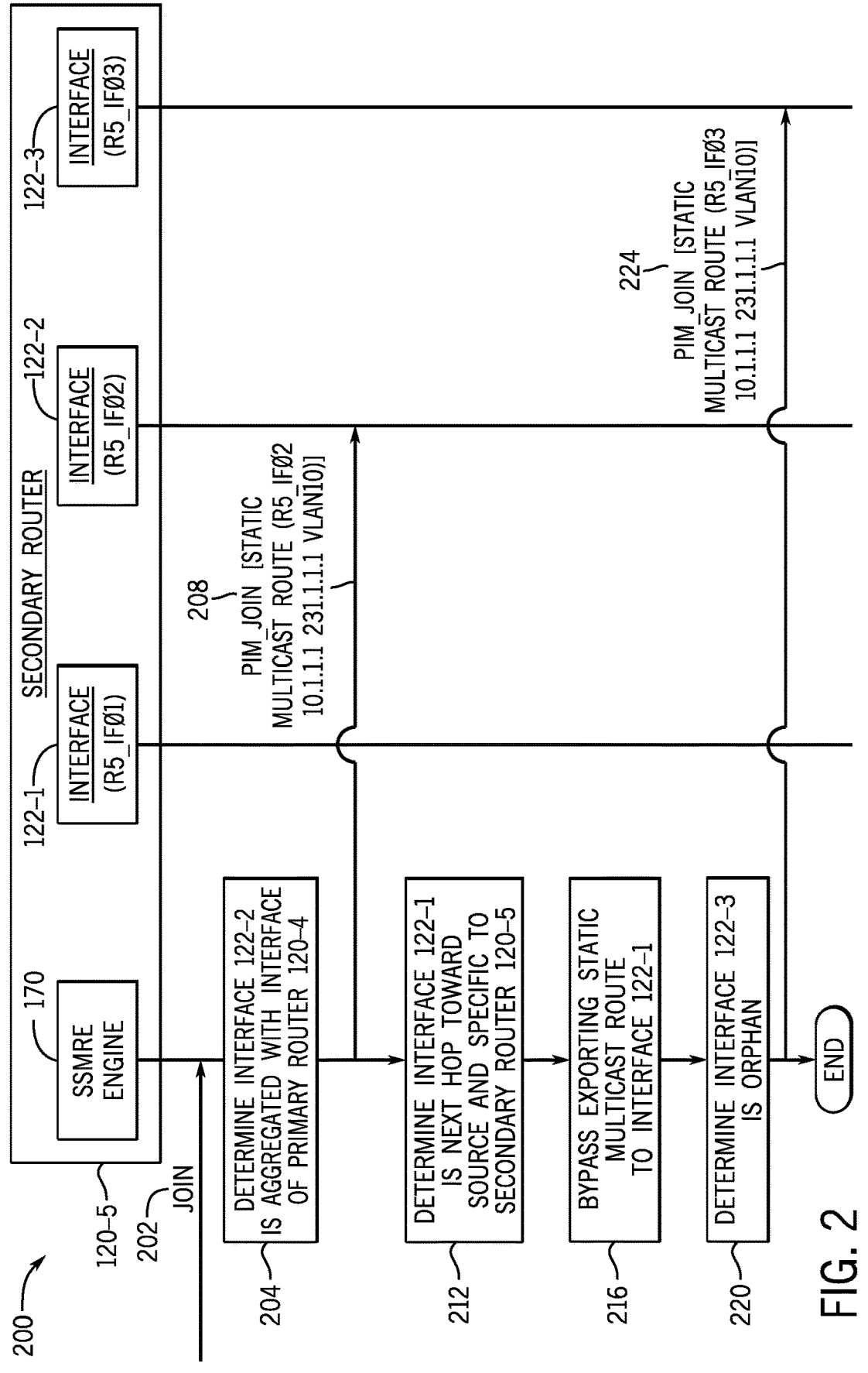
FIG. 2 is a flow diagram depicting a process used by a selective static multicast route export (SSMRE) engine of an HA pair of routers according to an example implementation.

FIG. 2 is a flow diagram 200 depicting a process used by the SSMRE engine 170 for purposes of exporting static multicast routes from the secondary router 120-5, in accordance with example implementations. Referring to FIG. 2, in accordance with example implementations, the SSMRE engine 170, may, in response to receiving a join 202 (e.g., a PIM join or an IGMP join), perform actions based on classifications of the interfaces 122-1, 122-2 and 122-3 of the secondary router 120-5. Although, in the following description, the SSMRE engine 170 determines the classifications, in accordance with further implementations, the interfaces 122-1, 122-2 and 122-3 may have previously been classified.

As depicted at 204, the SSMRE engine 170 may determine that the interface 122-2 is aggregated with the primary router 120-4. Stated differently, the SSMRE engine 170 determines that the interface 122-2 is associated with Group 1. As such, the interface 122-2 would not be an RPF interface for any multicast packets received on the interface 122-2, and as such, as depicted at 208, the SSMRE engine 170 causes the secondary router 120-5 to send a PIM join from the interface 122-2, which exports the static multicast route that includes the interface 122-2 as the ingress interface.

As depicted at 212, the SSMRE engine 170 determines that the interface 122-1 of the secondary router 120-5 is the next hop toward the source and is specific to the secondary router 120-5. Stated differently, the SSMRE engine 170 determines that the interface 122-1 belongs to Group 2. Accordingly, the SSMRE engine 170 bypasses exporting a static multicast route via the interface 122-1, as depicted at 216, as the interface 122-1 may potentially be an RPF interface for the multicast group.

As depicted at 220, the SSMRE engine 170 determines that the interface 122-3 of the secondary router 120-5 is an orphan. Stated differently, the SSMRE engine 170 determines that the interface 122-3 belongs to Group 3. Therefore, the SSMRE engine 170 causes the secondary router 120-5 to export, via interface 122-3, the static multicast route having the interface 122-3 as the ingress interface, as depicted at 224.

Figure 3:
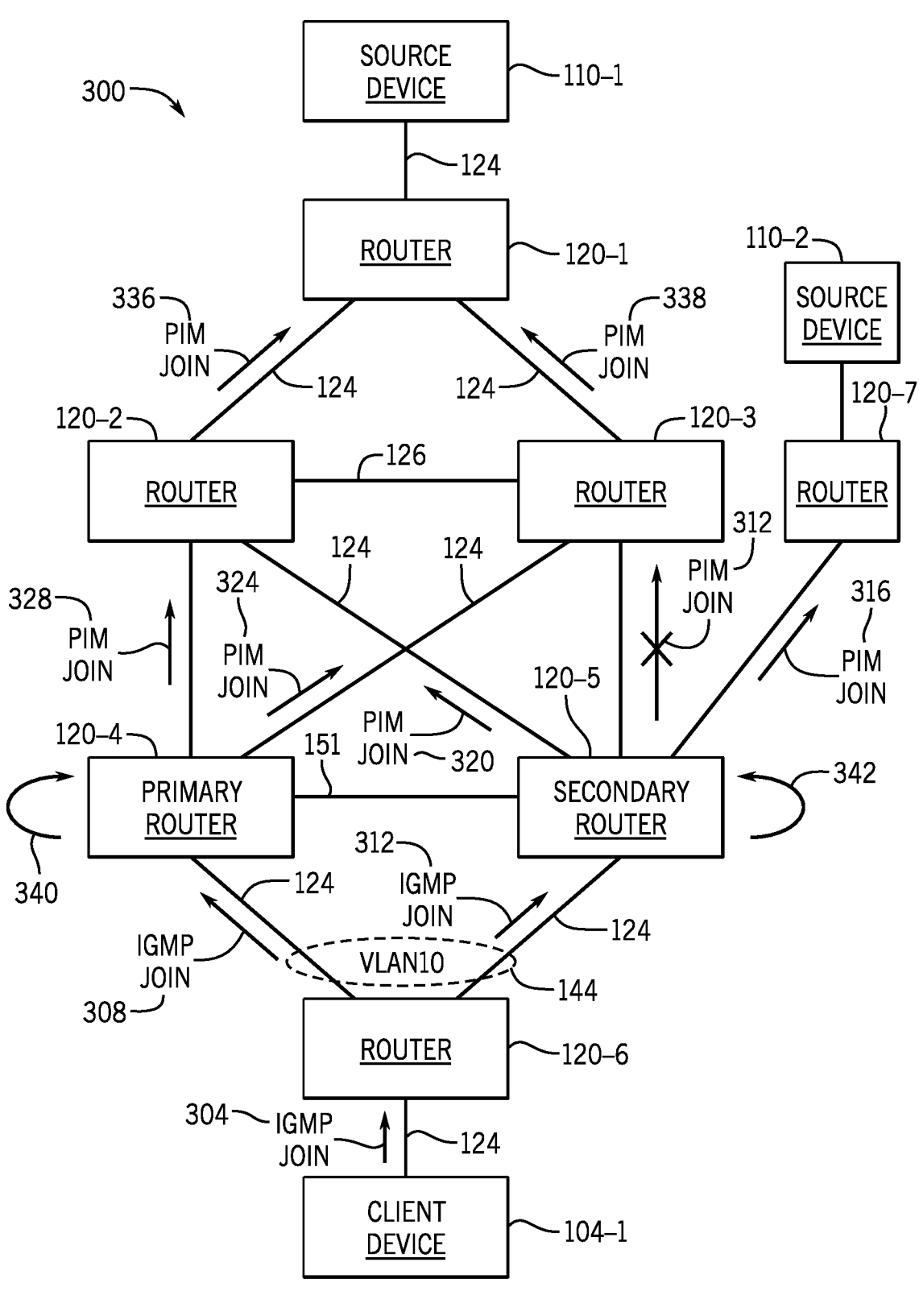
FIG. 3 is an illustration of the selective communication of Protocol Independent Multicast (PIM) joins by a secondary router of an HA pair of routers according to an example implementation.

FIG. 3 depicts an illustration 300 of the exporting of static multicast routes in response to an IGMP join 304 from the client device 104-1, in accordance with example implementations. In response to receiving the IGMP join 304, the router 120-6 provides corresponding IGMP joins 308 and 312 that are received by the primary router 120-4 and the secondary router 120-5, respectively.

As depicted in FIG. 3, the primary router 120-4 and the secondary router 120-5 undergo corresponding redistribute operations 340 and 342, respectively. A redistribute operation, in general, causes the router 120 to export static multicast routes via PIM joins. More specifically, the primary router 120-4 exports static multicast routes on all of its upstream interfaces, as depicted at reference numerals 320, 324 and 328. The secondary router 120-5, however, selectively exports its static multicast routes. In this manner, the secondary router 120-5 exports static multicast routes via PIM joins through Group 1 and 3 interfaces, as depicted at 312, 316 and 320. However, as depicted at 312, (and the corresponding "X"), the secondary router 120-5 does not export a static multicast route via a Group 2 interface (here, the interface that connects the secondary router 120-5 to the router 120-3).

As also depicted in FIG. 3, other routers 120 may also export static multicast routes upstream to build the multicast distribution tree. For example, as depicted in FIG. 3, the router 120-2 may export a static multicast route upstream to the router 120-2 via a PIM join 336. As another example, the router 120-3 may export a static multicast route to the router 120-1 via a PIM join 338.

Figure 4:
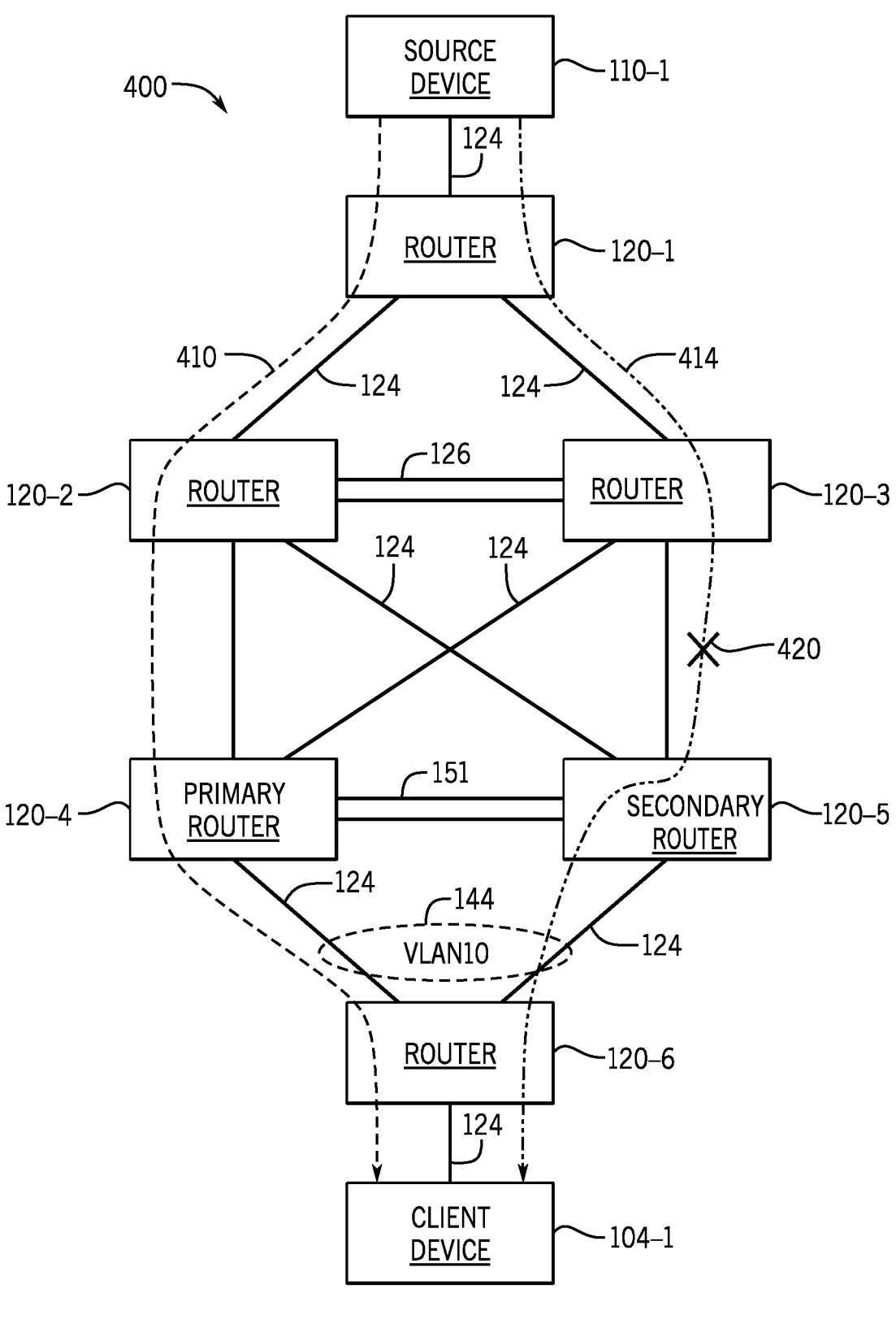
FIG. 4 is an illustration of the routing of multicast traffic through a network that includes a multicast distribution tree set up to prevent an HA pair of routers from sending out duplicate multicast traffic flows according to an example implementation.

Due to the selective exporting of static multicast routes by the secondary router 120-5, the secondary router 120-5 is effectively excluded from the multicast distribution tree. More specifically, FIG. 4 depicts an illustration 400 of the routing of a particular multicast traffic flow in the network, according to an example implementation. FIG. 4 illustrates how the selective exporting of static multicast routes by the secondary router 120-5 excludes the secondary router 120-5 from the multicast distribution tree.

More specifically, referring to FIG. 4, due to the exclusion of the secondary router 120-5 from the multicast distribution tree, the source device 110-1 sends out a multicast traffic flow, which, as depicted in FIG. 4, propagates along a path 410 through the router 120-1, the router 120-2, the primary router 120-4, the router 120-6 and ending at the client device 104-1. For comparison, FIG. 4 depicts a path 414 for the multicast traffic flow, which would exist if not for the selective exporting of static multicast routes by the secondary router 120-5. The absence of the path 414 for the multicast traffic flow is indicated by the "X" at 420. Without the duplicate traffic flow 414 being excluded, or prevented, both traffic flows 410 and 414 would otherwise reach the HA pair and result in the secondary router 120-5 sending a duplicate multicast traffic flow to the VLAN10 interface 144. However, due to the selective exporting of the static multicast routes by the secondary router 120-5, a duplicate multicast traffic flow is prevented.

Figure 5:
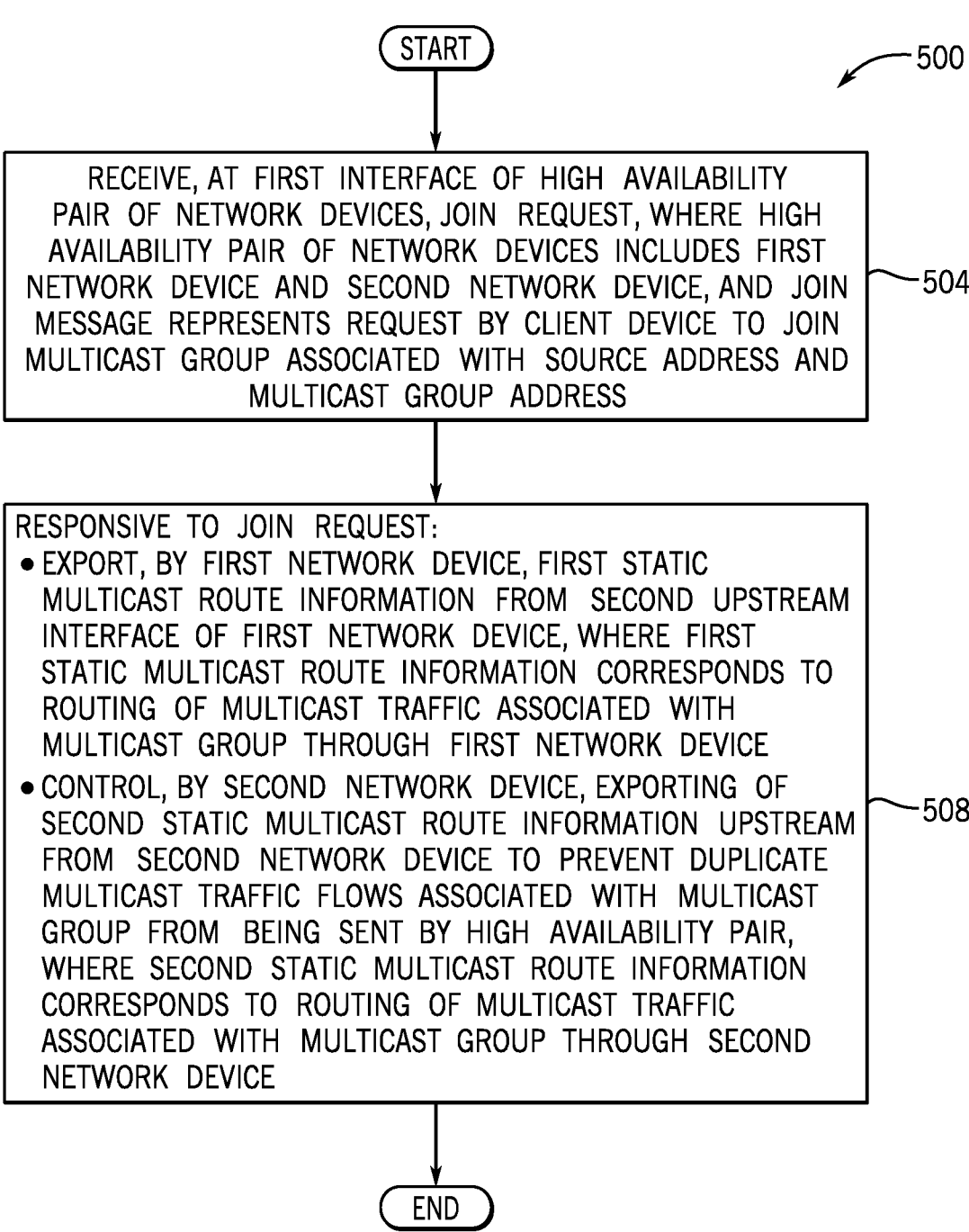
FIG. 5 is a flow diagram depicting a process used by a network device of an HA pair of network devices to selectively export static multicast routes to prevent the HA pair from sending out duplicate multicast traffic flows according to an example implementation.

Referring to FIG. 5, in accordance with example implementations, a process 500 includes receiving (block 504), at a first interface of a high availability pair of network devices, a join request. The high availability pair of network devices includes a first network device and a second network device. In an example, the high availability pair of network devices may be a high availability pair of routers. In an example, the high availability pair of network devices may form a virtual switch. The join request represents a request by a client device to join a multicast group associated with a source address and a multicast group address. In an example, the join request may be a PIM message.

The process 500 includes, pursuant to block 508, responsive to the join request, exporting, by the first network device, first static multicast route information from a second interface of the first network device. The first static multicast route information corresponds to a routing of multicast traffic associated with the multicast group through the first network device. In an example, the first static multicast route information may identify the second interface as an ingress interface of a path through the first network device associated with the multicast group, and the first static multicast route information may identify another interface of the first network device as an egress interface associated with the multicast group. In an example, the exporting of the first static multicast information may include the first network device sending a PIM join message in a direction toward the multicast source.

In an example, the first network device may be associated with a primary role for the high availability pair of network devices, and the second network device may be associated with a secondary role for the high availability pair of network devices. In an example, the designations of the primary and secondary roles may be based on the particular network device that takes over in the event that an inter-switch communication link between the first and second network devices fails. In an example, one of the network devices of the high availability pair takes over for the other network device of the high availability pair should the other network device fail. In an example, this takeover occurs without interruption.

Pursuant to block 508, the process 500 further includes, responsive to the join request, controlling, by the second network device, exporting of second static multicast route information from the second network device to prevent duplicate multicast traffic associated with the multicast group from being sent by the high availability pair. In an example, the second static multicast route information corresponds to a routing of the multicast traffic associated with the multicast group through the second network device.

In an example, controlling the exporting of the second static route information includes classifying the interfaces of the second network device. The classification may include identifying potential RPF interfaces of the second network device for purposes of excluding these interfaces from the corresponding multicast distribution tree. In an example, the classification corresponding to potential RPF interfaces may consider criteria of whether an interface is specific to the second network device and not associated with the first network device and whether the interface corresponds to a next hop toward the multicast source. The classification may further include such classifications as whether a particular interface is an orphan interface and whether a particular interface is associated with the first network device, and these other classifications may correspond to interfaces through which the second static multicast route information is exported.

Referring to FIG. 6, in accordance with example implementations, a non-transitory machine-readable storage medium 600 stores machine-readable instructions 610. The instructions 610, when executed by a given router of a high availability pair of routers, causes the given router to receive a join request that represents a request by a client device to join a multicast group associated with a source address and a multicast group address. In an example, the high availability pair of network devices may form a virtual switch. In an example, the join request may be a PIM message.

In an example, the given router may be associated with a secondary role for the high availability pair of routers, and the other router of the high availability pair may be associated with a primary role. In an example, the designations of the primary and secondary roles may be based on the particular router of the high availability pair that takes over in the event that an inter-switch communication link between the routers fails. In an example, one of the routers of the high availability pair takes over for the other router should the other router fail. In an example, this takeover occurs without interruption. In an example, the high availability pair of routers may be part of a distribution layer of a network.

The instructions 610, when executed by the given router, further cause the given router to classify a given interface of the given router based on whether the given interface is associated with a next hop toward the source address and whether the given interface is associated with the other router of the high availability pair of routers. The instructions 610, when executed by the given router, further cause the given router to, responsive to the join request, selectively export static multicast route information via the given interface based on the classification. In an example, the static multicast route information corresponds to a routing of the multicast traffic associated with the multicast group through the given router. In an example, the given router exports the static multicast route information by sending a PIM join message containing the static multicast route information upstream toward the source address.

In an example, the given router may not export the static multicast route information via the given interface in response to determining that the given interface is not associated with a next hop toward the source address and determining that the given interface is not associated with the other router of the high availability pair. In an example, the given router may export the static multicast route information via the given interface in response to determining that the given interface is an orphan. In an example, the given router may export the static multicast route information via the given interface in response to determining that the given interface is associated with the other router of the high availability pair. In an example, the given router may export the static multicast route information via the given interface in response to determining that the given interface is not associated with the next hop toward the source address.

Referring to FIG. 7, in accordance with example implementations, a system 700 includes a pair 710 of network devices to provide a virtual switch. The pair 710 includes a first network device 720 and a second network device 730. In an example, the pair 710 is a high availability pair such that one network device 720, 730 of the pair 710 takes over for the other network device 720, 730 of the pair, should the other network device 720,730 fail. In an example, the pair 710 is a high availability routers. In an example, the pair 710 may be part of a distribution layer of an network. In an example, the first network device 720 and the second network device 730 may communicate with each other via an inter-switch communication link. In an example, the first network device 720 and the second network device 730 may communicate information (e.g., MAC addresses and ARP addresses) that is used by the surviving network device 720, 730 should the other network device 720, 730 fail.

The first network device 720 is associated with a primary role for the pair 710 of network devices. In an example, the designation of the primary roles corresponds to the network device of the pair 710, which takes over should an inter-switch communication link between the network switches fails.

The first network device 720 to, responsive to the pair 700 of network devices receiving a join request, export first static multicast route information via a first network interface of the first network device 720. The first join request represents a request by a client device to join a multicast group associated with a source address and a multicast group address, and the first static multicast route information identifies the first network interface as being an incoming interface to receive multicast traffic associated with the multicast group, identifies an outgoing interface of the first network device for the multicast traffic, identifies the source address and identifies the group address.

In an example, the first static multicast route information corresponds to a routing of the multicast traffic associated with the multicast group through the first network device 720. In an example, the first network device 720 exports the first static multicast route information by sending a PIM join message containing the static multicast route information upstream toward the source address.

The second network device 730 is associated with a secondary role for the pair 700 of network devices. The second network device 730 to, responsive to the pair 700 of network devices receiving the join request, determine whether a second network interface of the second network device 730 is associated with a next hop toward the source address and whether the second network interface is aggregated with an interface of the first network interface. The second network device 730, responsive to the pair 700 of network devices receiving the join request and responsive to the determination, selectively exports second static multicast route information via the second network interface.

In an example, the second network device 730 may not export the second static multicast route information via the second network interface in response to determining that the second network interface is not associated with a next hop toward the source address and determining that the second network interface is not associated with the first network device 720. In an example, the second network device 730 may export the second static multicast route information via the second network interface in response to determining that the second network interface is an orphan. In an example, the second network device 730 may export the second static multicast route information via the second network interface in response to determining that the second network interface is associated with the first network device 720. In an example, the second network device 730 may export the second static multicast route information via the second network interface in response to determining that the second network interface is not associated with the next hop toward the source address.

In an example, the second static multicast route information corresponds to a routing of the multicast traffic associated with the multicast group through the second network device 730. In an example, the second network device 730 exports the second static multicast route information by sending a PIM join message containing the static multicast route information upstream toward the source address.

In accordance with example implementations, the controlling includes determining, by the second network device, whether a second interface of the second network device corresponds to a next hop toward the source address; and selectively exporting, by the second network device, the second static multicast route information via the second interface based on a result of the determination. Particular advantages include preventing duplicate multicast traffic flows from being sent to client devices.

In accordance with example implementations, the second upstream interface does not correspond to a next hop toward the source address; and exporting the second multicast route information includes communicating the second static multicast information via the second interface. Particular advantages include preventing duplicate multicast traffic flows from being sent to client devices.

In accordance with example implementations, the second upstream interface corresponds to a next hop toward the source address. The process further includes determining, by the second network device, whether the second interface is aggregated with an interface of the first network device; and controlling communication of the second static multicast information via the second network interface based on a result of the determination of whether the second interface is aggregated. Particular advantages include preventing duplicate multicast traffic flows from being sent to client devices.

In accordance with example implementations, the second interface is aggregated with an interface of the first network device; and controlling communication of the second static multicast information includes selectively exporting the second static multicast information via the second upstream interface. Particular advantages include preventing duplicate multicast traffic flows from being sent to client devices.

In accordance with example implementations, the second interface is not aggregated with an interface of the first network device; and controlling communication of the second static multicast information includes preventing the second static multicast information from being exported via the second interface. Particular advantages include preventing duplicate multicast traffic flows from being sent to client devices.

In accordance with example implementations, the process includes controlling the exporting responsive to determining, by the second network device, that the second network device is associated with a secondary role for the pair of network devices. Particular advantages include preventing duplicate multicast traffic flows from being sent to client devices.

In accordance with example implementations, the process further includes the first and second network devices independently controlling respective control planes; and the first and second network devices controlling a data plane as a single virtual network device. Particular advantages include preventing duplicate multicast traffic flows from being sent to client devices.

In accordance with example implementations, the first static multicast route information identifies the first interface as being an ingress interface to receive the multicast traffic, identifies an aggregated interface of the high availability pair as an egress interface, identifies the source address and identifies the group address. Particular advantages include preventing duplicate multicast traffic flows from being sent to client devices.

In accordance with example implementations, exporting the first static multicast route information includes sending, through the first network interface, a PIM join message. Particular advantages include preventing duplicate multicast traffic flows from being sent to client devices.

In accordance with example implementations, receiving the join message includes receiving an IGMP join message or receiving a PIM join message. Particular advantages include preventing duplicate multicast traffic flows from being sent to client devices.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A method comprising:

receiving, at a first interface of a high availability pair of network devices, a join request, wherein the high availability pair of network devices comprises a first network device and a second network device, and the join request represents a request by a client device to join a multicast group associated with a source address and a multicast group address; and responsive to the first join request:

exporting, by the first network device, first static multicast route information from a second interface of the first network device, wherein the first static multicast route information corresponds to a routing of multicast traffic associated with the multicast group through the first network device; and controlling, by the second network device, exporting of second static multicast route information from the second network device to prevent duplicate multicast traffic associated with the multicast group from being sent by the high availability pair, wherein the second static multicast route information corresponds to a routing of the multicast traffic associated with the multicast group through the second network device, and wherein the controlling comprises:

determining, by the second network device, whether a second interface of the second network device corresponds to a next hop toward the source address; and selectively exporting, by the second network device, the second static multicast route information via the second interface based on a result of the determination.

2. The method of claim 1, wherein:

the second interface does not correspond to a next hop toward the source address; and selectively exporting the second static multicast route information comprises communicating the second static multicast information via the second interface.

3. The method of claim 1, wherein the second interface corresponds to a next hop toward the source address, the method further comprising:

determining, by the second network device, whether the second interface is aggregated with an interface of the first network device; and selectively exporting the second static multicast information comprises exporting the second static multicast information via the second network interface based on a result of the determination of whether the second interface is aggregated.

4. The method of claim 3, wherein:

the second interface is aggregated with an interface of the first network device; and selectively exporting the second static multicast route information comprises exporting the second static multicast information via the second interface.

5. The method of claim 3, wherein:

second interface is not aggregated with an interface of the first network device; and selectively exporting the second static multicast information comprises preventing the second static multicast information from being exported via the second interface.

6. The method of claim 1, further comprising:

controlling the exporting responsive to determining, by the second network device, that the second network device is associated with a secondary role for the pair of network devices.

7. The method of claim 1, further comprising:

the first and second network devices independently controlling respective control planes; and the first and second network devices controlling a data plane as a single virtual network device.

8. The method of claim 1, wherein the first static multicast route information identifies the first interface as being an ingress interface to receive the multicast traffic, identifies an aggregated interface of the high availability pair as an egress interface, identifies the source address and identifies the group address.

9. The method of claim 1, wherein exporting the first static multicast route information comprises sending, through the first network interface, a protocol independent multicast (PIM) join message.

10. The method of claim 1, wherein receiving the join request comprises receiving an Internet Group Management Protocol (IGMP) message or receiving a Protocol Independent Multicast (PIM) message.

11. A non-transitory machine-readable storage medium to store machine-readable instructions that, when executed by a given router of a high availability pair of routers, cause the given router to:

receive a join request representing a request by a client device to join a multicast group associated with a source address and a multicast group address;

classify a given interface of the given router based on whether the given interface is associated with a next hop toward the source address and whether the given interface is associated with the other router of the high availability pair of routers; and responsive to the join request, selectively export static multicast route information via the given interface based on the classification.

12. The storage medium of claim 11, wherein the static multicast route information identifies the given interface as being an incoming interface to receive multicast traffic, identifies an outgoing interface of the router for the multicast traffic, identifies the source address and identifies the group address.

13. The storage medium of claim 11, wherein:

the classification represents whether the exporting the static multicast route information through the given interface would cause the given router to receive a multicast traffic flow that is a duplicate of a multicast traffic flow received by the other router of the high availability pair of routers.

14. The storage medium of claim 13, wherein the instructions, when executed by the storage medium, further causes the router to not export the static multicast route information via the given interface responsive to the classification representing that the exporting of the static multicast route information through the given interface would cause the given router to receive a multicast traffic flow that is a duplicate of a multicast traffic flow received by the other router of the high availability pair of routers.

15. A system comprising:

a pair of network devices to collectively provide a virtual network switch, wherein the pair of network devices comprises:

a first network device, wherein the first network device is associated with a primary role for the pair of network devices, and the first network device to, responsive to the pair of network devices receiving a join request, export first static multicast route information via a first network interface of the first network device, wherein the first join request represents a request by a client device to join a multicast group associated with a source address and a multicast group address, and the first static multicast route information identifies the first network interface as being an incoming interface to receive multicast traffic associated with the multicast group, identifies an outgoing interface of the first network device for the multicast traffic, identifies the source address and identifies the group address; and a second network device, wherein the second network device is associated with a secondary role for the pair of network devices, and the second network device to, responsive to the pair of network devices receiving the join request:

determine whether a second network interface of the second network device is associated with a next hop toward the source address and whether the second network interface is aggregated with an interface of the first network interface; and responsive to the determination, selectively export second static multicast route information via the second network interface.

16. The system of claim 15, further comprising:

a network comprising a distribution layer, an access layer and a core layer, and the pair of network devices are part of the distribution layer.

17. The system of claim 15, wherein the pair of network devices to fail over to the first network device responsive an interruption in an inter-switch link between the first network device and the second network device.

18. The system of claim 15, wherein the second network device to further, responsive to the pair of network devices receiving the join request:

responsive to the determination, not export the second static multicast route information via the second network interface;

determine a third network interface of the second network device is an orphan; and responsive to determining that the third network interface is an orphan, export third static multicast route information via the third network interface.

19. The system of claim 15, wherein the second network device to further, responsive to the pair of network devices receiving the join request:

responsive to the determination, not export the second static multicast route information via the second network interface;

determine a third network interface of the second network device is not aggregated with an interface of the first network device; and responsive to determining that the third network interface is not aggregated with an interface of the first network device, export third static multicast route information via the third network interface.

* * * * *